(12) United States Patent
Fu et al.

(10) Patent No.: US 12,347,152 B2
(45) Date of Patent: Jul. 1, 2025

(54) SYSTEM AND METHOD FOR POLARIZATION DETECTION OF TARGET IN STRONG BACKGROUND

(71) Applicant: Changchun University of Science and Technology, Changchun (CN)

(72) Inventors: Qiang Fu, Changchun (CN); Xuanwei Liu, Changchun (CN); Hua Cai, Changchun (CN); Haodong Shi, Changchun (CN); Zhuang Liu, Changchun (CN); Yingchao Li, Changchun (CN); Huilin Jiang, Changchun (CN)

(73) Assignee: Changchun University of Science and Technology, Changchun (CN)

( * ) Notice: Subject to any disclaimer, the term of this patent is extended or adjusted under 35 U.S.C. 154(b) by 0 days.

(21) Appl. No.: 18/756,716

(22) Filed: Jun. 27, 2024

(65) Prior Publication Data
US 2025/0005877 A1    Jan. 2, 2025

(30) Foreign Application Priority Data
Jun. 27, 2023  (CN) .......................... 202310759860.2

(51) Int. Cl.
*G06V 10/145* (2022.01)
*G06V 10/52* (2022.01)
(Continued)

(52) U.S. Cl.
CPC ............ *G06V 10/145* (2022.01); *G06V 10/52* (2022.01); *G06V 10/56* (2022.01); *G06V 10/60* (2022.01);
(Continued)

(58) Field of Classification Search
None
See application file for complete search history.

(56) References Cited

U.S. PATENT DOCUMENTS

| 2019/0052792 A1* | 2/2019 | Baba ...................... H04N 23/90 |
| 2022/0196459 A1* | 6/2022 | Song ...................... G06N 3/045 |
| 2024/0184309 A1* | 6/2024 | Cheng ..................... G01S 7/499 |

FOREIGN PATENT DOCUMENTS

| CN | 104574296 A | 4/2015 |
| CN | 106846288 A | 6/2017 |

(Continued)

OTHER PUBLICATIONS

Li, X.—"A-BFPN: An Attention-Guided Balanced Feature Pyramid Network for SAR Ship Detection"—Remote Sensing 2022—pp. 1-19 (Year: 2022).*

(Continued)

*Primary Examiner* — Bernard Krasnic
(74) *Attorney, Agent, or Firm* — Gurr & Brande, PLLC; Robert A. Gurr

(57) ABSTRACT

A system and method for polarization detection of a target in a strong background are provided. The system includes: an image signal acquisition module configured for image information acquisition and signal conversion of a plurality of channels; a YoLoV3 neural network-based feature extraction module configured to increase a number of network layers, obtain a fused feature map combined with intensity information and polarization information, and extract a feature difference between an intensity modality and a polarized light modality; a Darknet53 neural network-based feature extraction module configured to extract a feature value of a high dynamic range image; a residual network-based feature fusion module configured to learn weights of different modalities, obtain a fused feature map of intensity modality information and polarization modality information, and select and optimize the fused feature map by attention mechanism processing; and an image printing module configured to filter background information.

4 Claims, 3 Drawing Sheets

(51) Int. Cl.
  *G06V 10/56* (2022.01)
  *G06V 10/60* (2022.01)
  *G06V 10/77* (2022.01)
  *G06V 10/80* (2022.01)
  *G06V 10/82* (2022.01)

(52) U.S. Cl.
  CPC ........ *G06V 10/7715* (2022.01); *G06V 10/806* (2022.01); *G06V 10/82* (2022.01)

(56) References Cited

FOREIGN PATENT DOCUMENTS

| | | | |
|---|---|---|---|
| CN | 107633495 | A | 1/2018 |
| CN | 107909112 | A | 4/2018 |
| CN | 111292279 | A | 6/2020 |
| CN | 111445430 | A | 7/2020 |
| CN | 113358063 | A | 9/2021 |
| CN | 114693577 | A | 7/2022 |
| CN | 115265365 | A | 11/2022 |
| CN | 115393233 | A | 11/2022 |
| CN | 115861608 | A | 3/2023 |
| CN | 116229181 | A * | 6/2023 |
| WO | 2022204666 | A1 | 9/2022 |

OTHER PUBLICATIONS

Li, Q.—"A Decoupled Head and Coordinate Attention Detection Method for Ship Targets in SAR Images"—IEEE—Dec. 2022—pp. 128562-128578 (Year: 2022).*

Gao, G.—"Dualistic cascade convolutional neural network dedicated to fully PolSAR image ship detection"—ISPRS Journal of Photogrammetry and Remote Sensing—2023—pp. 663-681 (Year: 2023).*

* cited by examiner

SYSTEM AND METHOD FOR POLARIZATION DETECTION OF TARGET IN STRONG BACKGROUND

CROSS REFERENCE TO RELATED APPLICATION

This patent application claims the benefit and priority of Chinese Patent Application No. 202310759860.2, filed with the China National Intellectual Property Administration on Jun. 27, 2023, the disclosure of which is incorporated by reference herein in its entirety as part of the present application.

TECHNICAL FIELD

The present disclosure belongs to the field of optical detection, and in particular, to a system and method for polarization detection of a target in a strong background.

BACKGROUND

A polarization detection technique can obtain features such as a polarization state and a spatial contour of a target using polarization characteristics of light, thereby increasing a contrast ratio of the target in an image. Meanwhile, a polarization imaging detection system has outstanding advantages in the field of faint target detection under strong background light for high stability, strong anti-interference capability, and a long detection distance thereof.

Due to the influence of strong background light, a scene has rich color information and lighting information, and a dynamic range of the scene is large. Limited by a hardware structure of an ordinary video camera, a dynamic range of a real scene exceeds a range that the ordinary video camera can capture by far. A high dynamic range image simultaneously shows more detailed information at bright and dark positions of a natural scene by expanding a dynamic range, and contains rich color information and has a high contrast ratio. The information contained in the high dynamic range image is closer to the real scene, and a luminance value of a pixel is directly proportional to an actual luminance value of a corresponding point in the scene. Therefore, this technique can reflect details at a high luminance position contained in a low exposure image and also can reflect details at a low luminance position contained in a high exposure image.

However, the high dynamic range image has a large luminance interval and a nonuniform luminance distribution. A traditional mapping algorithm takes no account of luminance distribution characteristics of an image and thus is prone to losing details in extremely bright and dark regions. It is considered that very bright and very dark original intervals have little influence on each other. Therefore, there is a need for a more effective method to solve the problems of poor target detection and identification capability under strong background light, and low definition and contrast ratio of an image.

SUMMARY

The present disclosure provides a system and method for polarization detection of a target in a strong background to solve the problems of poor target detection and identification capability under strong background light, and low definition and contrast ratio of an image.

The present disclosure is implemented through the following technical solutions.

A system for polarization detection of a target under strong background light based on multimodal weighted fusion includes:
- an image signal acquisition module configured for image information acquisition and signal conversion of a plurality of channels;
- a YoLoV3 neural network-based feature extraction module configured to increase a number of network layers, enhance a feature extraction capability, obtain a fused feature map combined with intensity information and polarization information, and extract a feature difference between an intensity modality and a polarized light modality;
- a Darknet53 neural network-based feature extraction module configured to obtain a feature image containing rich detailed information and extract a feature value of a high dynamic range image;
- a residual network-based feature fusion module configured to learn weights of different modalities such that feature information of the different modalities is fused better, obtain a fused feature map of intensity modality information and polarization modality information better combined with high dynamic range image modality information, and select and optimize the fused feature map by attention mechanism processing; and
- an image printing module configured to filter background information and print an image containing only accurate target information.

In the system for polarization detection of a target under strong background light based on multimodal weighted fusion, the image signal acquisition module includes a light filter, a polarizer, a charge coupled device (CCD) detector, a multiplexer, and an analog to digital (A/D) converter;
- the light filter is configured to transmit a received image to the YoLoV3 neural network-based feature extraction module and the multiplexer sequentially through the polarizer and the CCD detector separately; and the multiplexer is configured to transmit the received image to the Darknet53 neural network-based feature extraction module through the A/D converter.

In the system for polarization detection of a target under strong background light based on multimodal weighted fusion, the YoLoV3 neural network-based feature extraction module includes a convolutional layer, a normalization layer, a Leaky ReLU activation function, an intensity information multi-scale feature extraction module, and a polarization information multi-scale feature extraction module;
- the convolutional layer is configured to receive an image signal from the CCD detector and transmit the image signal to the intensity information multi-scale feature extraction module and the polarization information multi-scale feature extraction module separately after the image signal passes through the normalization layer and the Leaky ReLU activation function; and the intensity information multi-scale feature extraction module and the polarization information multi-scale feature extraction module are configured to transmit image signals after extraction of features to the residual network-based feature fusion module.

In the system for polarization detection of a target under strong background light based on multimodal weighted fusion, the Darknet53 neural network-based feature extraction module includes luminance layer image conversion, chromaticity layer image conversion, luminance layer image partitioning, logarithmic compression, guided filtering, luminance layer and chromaticity layer fusion, and luminance and chromaticity fused image feature extraction;

the luminance layer image conversion and the chromaticity layer image conversion are configured to separately receive a high dynamic range target information image sent by the A/D converter; the luminance layer image conversion is configured to subject the high dynamic range target information image to the luminance layer image partitioning and then the logarithmic compression; an image signal after the logarithmic compression is subjected to the guided filtering and the luminance layer and chromaticity layer fusion separately, and an image signal after the chromaticity layer image conversion is also subjected to the guided filtering; and a feature is extracted from an image after the luminance layer and chromaticity layer fusion and transmitted to the residual network-based feature fusion module.

In the system for polarization detection of a target under strong background light based on multimodal weighted fusion, the residual network-based feature fusion module includes a Res1 residual network unit, a Res2 residual network unit, a Res8 residual network unit, a Res8 residual network unit, a Res4 residual network unit, a multimodal information integration unit, a Concat cascade unit, a weight analysis unit, a weighted fusion unit, an attention mechanism processing unit, a loss function analysis unit, and a final feature image acquisition unit;

the Res1 residual network unit, the Res2 residual network unit, the Res8 residual network unit, and the Res4 residual network unit are configured to effectively avoid a problem of model degeneration caused by an excessive number of network layers;

the Res1 residual network unit, the Res2 residual network unit, the Res8 residual network unit, and the Res4 residual network unit are configured to receive images signals after extraction of features by the intensity information multi-scale feature extraction module and the polarization information multi-scale feature extraction module and an image signal after extraction of features following the luminance layer and chromaticity layer fusion, and transmit the image signals to the multimodal information integration, the Concat cascade, and the weight analysis, respectively, and sequentially subject the images of three sets of features to the weighted fusion, the processing using the attention mechanism, the loss function analysis, and the final feature image acquisition, and then transmit the final feature image to the image printing module.

In the system for polarization detection of a target under strong background light based on multimodal weighted fusion, the image printing module is configured for threshold comparison, half-tone image generation, and image printing; and after a gray value of a pixel of the final feature image is compared with a set threshold, the half-tone image generation is performed on the image and an image containing only accurate target information is printed.

A method for polarization detection of a target under strong background light based on multimodal weighted fusion uses the system for polarization detection of a target under strong background light based on multimodal weighted fusion as described above and specifically includes:

step 1: inlaying light filters and polarizers in alignment with CCD detectors, where each group of one light filter and one polarizer inlaid in alignment with the CCD detector form one channel, and a total of 7 channels are obtained;

step 2: acquiring target information images from the 7 channels in step 1, and integrating the target information images from the 7 channels into one image channel and converting an image signal into a high dynamic range target information image;

step 3: transferring the target information images in step 2 to the YoLoV3 neural network-based feature extraction module for encoding and decoding operations;

step 4: subjecting the decoded information in step 3 into the Leaky ReLU activation function, and acquiring a feature map $\{I_1,I_2,I_3\}$ of an intensity modality and a feature map $\{P_1,P_2,P_3\}$ of a polarization modality;

step 5: collecting a high dynamic range target information image output by the A/D converter based on a Darknet53 neural network-based feature extraction module, performing the guided filtering on a result of compressing a high luminance layer image after image information conversion, luminance partitioning, logarithmic compression and partitioning, and then performing luminance and chromaticity fusion on the image to finally obtain a feature map $\{V_1,V_2,V_3\}$ of a luminance and chromaticity fused modality;

step 6: performing the multimodal weighted fusion on the feature map $\{I_1,I_2,I_3\}$ of the intensity modality, the feature map $\{P_1,P_2,P_3\}$ of the polarization modality, and the feature map $\{V_1,V_2,V_3\}$ of the luminance and chromaticity fused modality in step 4, followed by dimension reduction, describing features of different modalities after the dimension reduction, and then performing feature map fusion to obtain a weighted fused feature map;

step 7: optimizing the weighted fused feature map in step 6 and then performing loss function analysis, and transferring a resulting final feature image containing richest detailed information to the image printing module;

step 8: comparing a gray value of a pixel of the final feature image obtained in step 7 with a threshold $\delta$, and separating a background and the target;

where when the gray value of the pixel is greater than the threshold $\delta$, the pixel is classified as a background pixel; when the gray value of the pixel is less than the threshold $\delta$, the pixel is classified as a target pixel, and separation of the background and the target is realized; and the threshold $\delta$ is acquired by a neural network based on image information in real time; and step 9: generating a half-tone image from the separated target information in step 8 and printing the half-tone image.

In the method for polarization detection of a target under strong background light based on multimodal weighted fusion, step 3 specifically includes:

step 3.1: collecting target information images of the CCD detectors from a plurality of channels based on the YoLoV3 neural network-based feature extraction module, and transferring the target information images to the convolutional layer to perform the encoding operation on the information; and step 3.2: after the convolutional layer encodes the information, transferring the encoded information to the normalization layer for the decoding operation; and step 4 specifically includes:
step 4.1: subjecting the decoded information into the Leaky ReLU activation function for running to allow for better performance of the neural network and obtain better data fitting; and
step 4.2: acquiring 3 multi-scale feature maps from the information after running in step 4.1 on intensity and polarization branches of the YoLoV3 neural network, respectively, where the feature map of the intensity modality is denoted as $\{I_1,I_2,I_3\}$, and the feature map of the polarization modality is denoted as $\{P_1,P_2,P_3\}$.

In the method for polarization detection of a target under strong background light based on multimodal weighted fusion, step 5 specifically includes:
step 5.1: collecting the high dynamic range target information image output by the A/D converter based on the Darknet53 neural network-based feature extraction module; and converting an input high dynamic range image to L*a*b* space through color space conversion, where L* records image luminance data, and a* and b* record image chromaticity details; accordingly, luminance layer and chromaticity layer images are obtained;
step 5.2: obtaining specific image luminance data according to L*, ascertaining a maximum luminance value and a minimum luminance value of the image, and dividing a luminance image into three intervals: low darkness ($L_D$-$L_{min}$), moderate ($L_B$-$L_D$), and high luminance ($L_{mac}$-$L_B$);
step 5.3: performing logarithmic compression and partitioning on a luminance layer image, where due to a large dynamic interval of the high dynamic range image, a same correction coefficient is realized for different luminance region images having a poor display effect; dividing a high luminance layer image, and selecting different adjustment parameters γ in different regions after logarithmic mapping to correct the luminance layer image;
step 5.4: using a result of compressing the high luminance layer image as a guide image to perform guided filtering on the chromaticity layer image; and
step 5.5: combining the filtered image chromaticity layer and the compressed high luminance layer image to obtain a luminance and chromaticity fused image, and extracting 3 multi-scale feature maps in the luminance and chromaticity fused image using the Darknet53 neural network, where the feature map of the luminance and chromaticity fused modality is denoted as $\{V_1,V_2,V_3\}$.

In the method for polarization detection of a target under strong background light based on multimodal weighted fusion, step 6 specifically includes:
step 6.1: performing multimodal weighted fusion on extracted features of the intensity modality, features of the polarization modality, and features of the luminance and chromaticity fused modality using a residual network;
step 6.2: performing dimension reduction on the feature maps $\{I_1,I_2,I_3\}$, $\{P_1,P_2,P_3\}$, and $\{V_1,V_2,V_3\}$ of different modalities using a neural network to complete integration of information of the modalities on different channels;
step 6.3: describing the features of different modalities using Concat cascade, where a feature descriptor of the luminance and chromaticity fused modality is $A_v$, a feature descriptor of the polarization modality is $A_p$, and a feature descriptor of the intensity modality is $A_I$, which are added as $A_m$;
step 6.4: dividing the feature descriptors of the three modalities by the feature descriptor sum $A_m$ as weights of the respective modalities, multiplying the weights with the feature maps and then performing cascading fusion to obtain the weighted fused feature map; and
step 6.5: performing weighted fusion on three sets of features obtained in steps 6.2 to 6.4 to obtain a multimodal weighted fused feature map denoted as $\{M_1, M_2, M_3\}$.

The present disclosure has following beneficial effects:
In the present disclosure, three groups of red, green, and blue light filters are employed to realize collection of different intensity information of a plurality of channels. Four groups of 0°, 45°, 90°, and 135° polarizers are employed to realize collection of different polarization information of a plurality of channels. The problems of a single detection channel and incomplete target information acquisition are solved.

The present disclosure employs the YoLoV3 neural network to extract multi-scale features from the intensity information and the polarization information, enhance the feature extraction capability, obtain the fused feature map combined with the intensity information and the polarization information, and extract the feature difference between the intensity modality and the polarized light modality.

The present disclosure employs the Darknet53 neural network to obtain the feature image containing rich detailed information and extract the feature value of the high dynamic range image. The adjustment parameters may be used to adjust the luminance and the chromaticity of the image to obtain the luminance and the chromaticity fused feature map that is most fit for a current application requirement.

The present disclosure employs the residual network to learn the weights of different modalities such that feature information of the different modalities is fused better, and obtain the fused feature map of the intensity modality information and the polarization modality information better combined with the high dynamic range image modality information. Moreover, the fused feature map is selected and optimized by processing using the attention mechanism. Finally, the loss function analysis is performed on the neural network. The visual visualization effect of the image can be enhanced, and meanwhile, the visual understanding capability is improved.

DETAILED DESCRIPTION OF THE EMBODIMENTS

Figure 1:
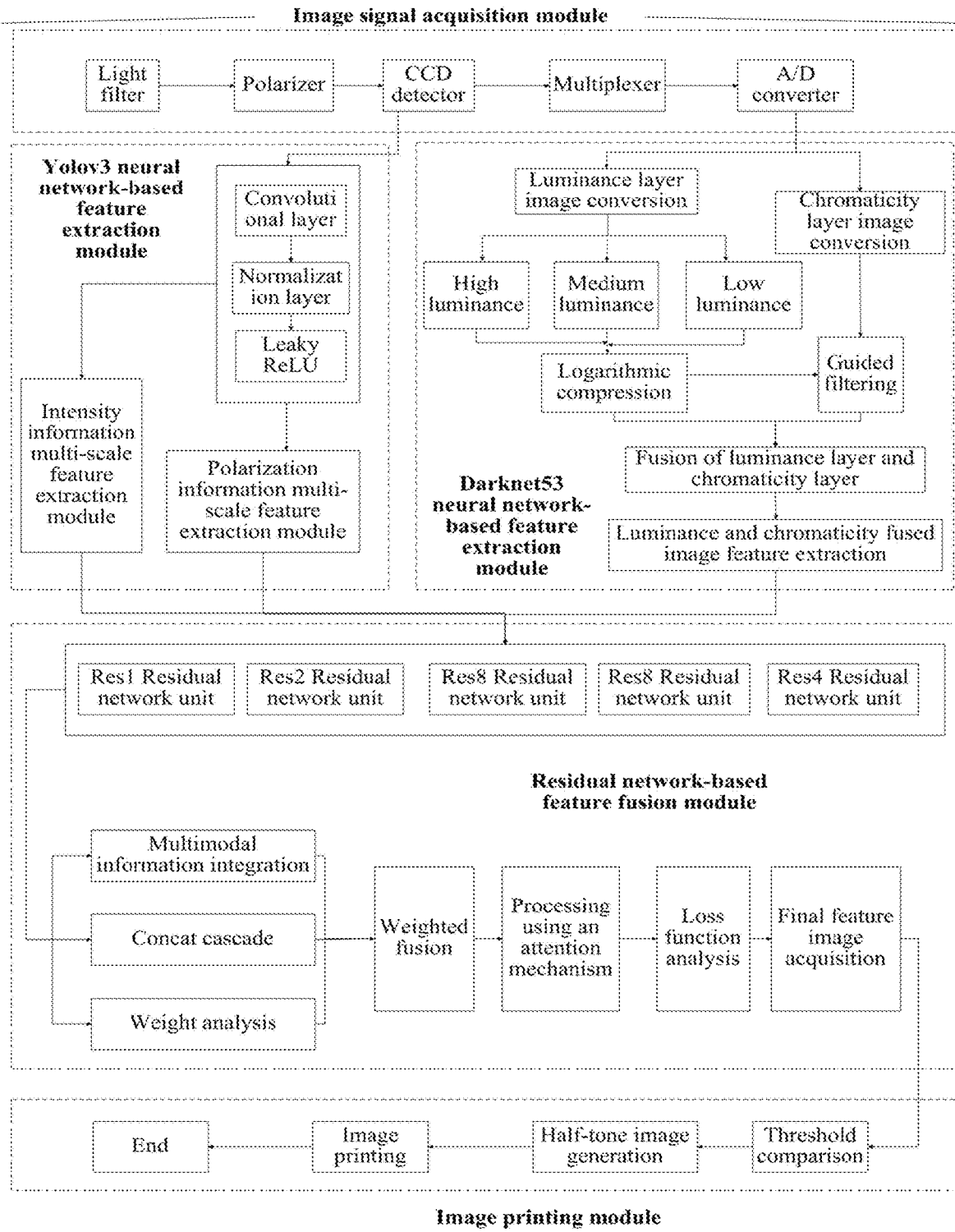
FIG. 1 is a structural schematic diagram according to the present disclosure.
Figure 2:
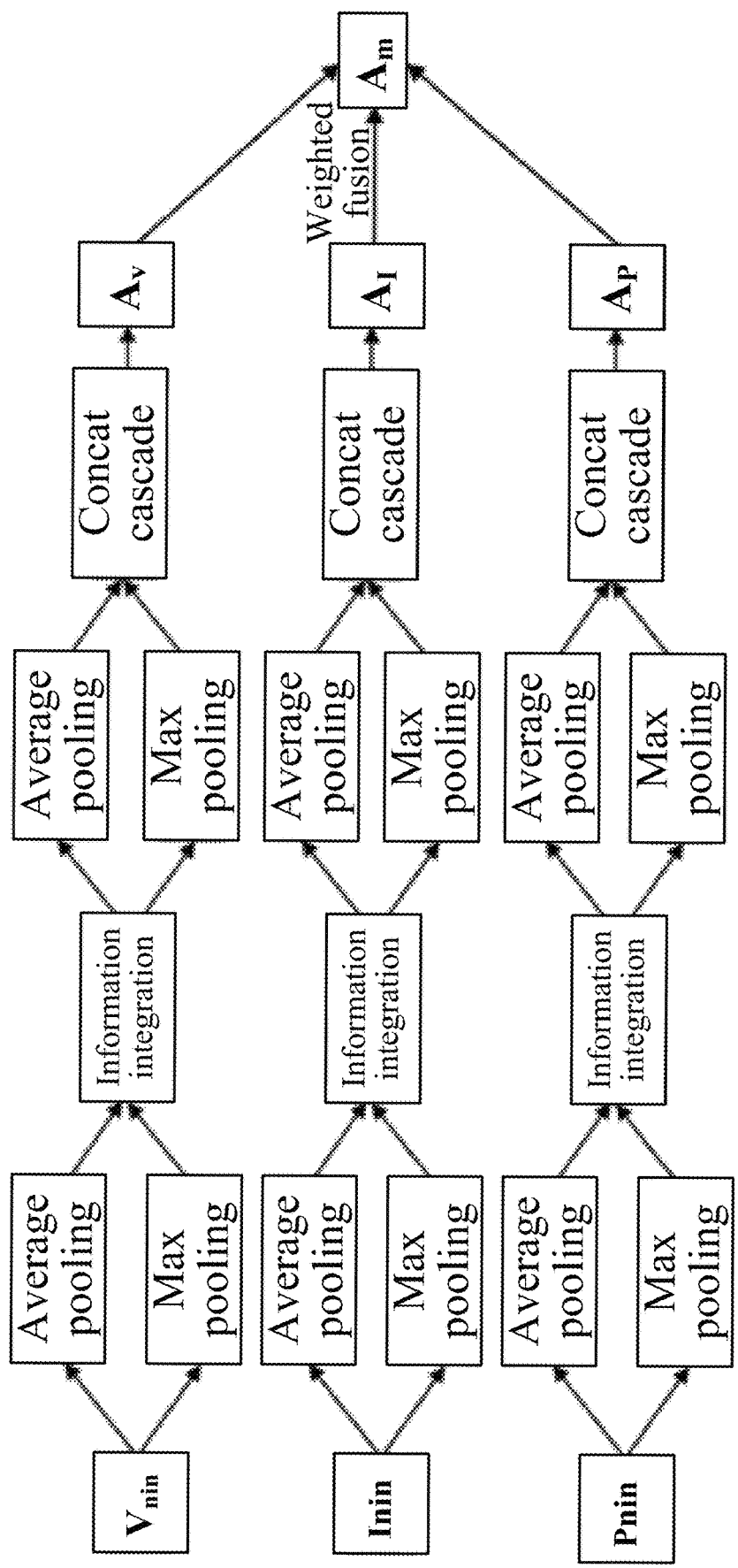
FIG. 2 is a structural diagram of a neural network for performing multimodal weighted fusion according to the present disclosure.
Figure 3:
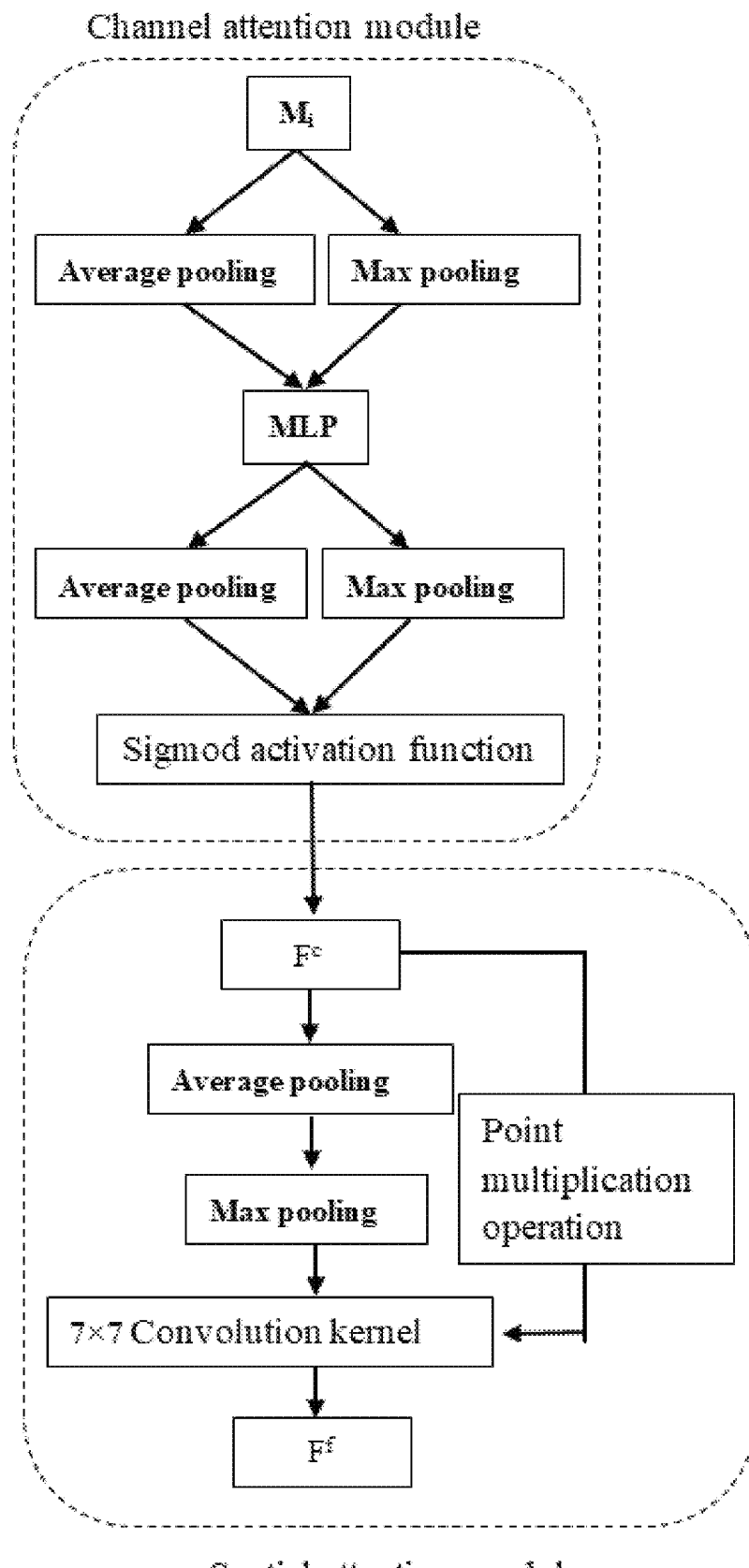
FIG. 3 is a structural diagram of a neural network for performing attention mechanism processing according to the present disclosure.

The technical solutions of the embodiments of the present disclosure are clearly and completely described below with reference to the accompanying drawings. Apparently, the described embodiments are only illustrative ones, and are not all possible ones of the present disclosure. All other embodiments obtained by those skilled in the art based on the embodiments of the present disclosure without creative efforts shall fall within the protection scope of the present disclosure.

A system for polarization detection of a target under strong background light based on multimodal weighted fusion includes an image signal acquisition module, a YoLoV3 neural network-based feature extraction module, a Darknet53 neural network-based feature extraction module, a residual network-based feature fusion module, and an image printing module.

The image signal acquisition module is configured for image information acquisition and signal conversion of a plurality of channels.

The YoLoV3 neural network-based feature extraction module is configured to increase a number of network layers, enhance a feature extraction capability, obtain a fused feature map combined with intensity information and polarization information, and extract a feature difference between an intensity modality and a polarized light modality.

The Darknet53 neural network-based feature extraction module is configured to obtain a feature image containing rich detailed information and extract a feature value of a high dynamic range image.

The residual network-based feature fusion module is configured to learn weights of different modalities such that feature information of the different modalities is fused better, obtain a fused feature map of intensity modality information and polarization modality information better combined with high dynamic range image modality information, and select and optimize the fused feature map by attention mechanism processing.

The image printing module is configured to filter background information and print an image containing only accurate target information.

In the system for polarization detection of a target under strong background light based on multimodal weighted fusion, the image signal acquisition module includes a light filter, a polarizer, a CCD detector, a multiplexer, and an A/D converter.

The light filter and the polarizer are inlaid in alignment with the CCD detector. A red light filter 620 nm to 750 nm, a green light filter 495 nm to 570 nm, and a blue light filter 476 nm to 495 nm are placed in front of different CCD detectors to obtain target intensity information images.

The polarizer is configured to acquiring a target polarization information image.

Each group of one light filter and one polarizer inlaid in alignment with the CCD detector form one channel, and a total of 7 channels are obtained.

The A/D converter is configured to convert an image signal into a digital signal and transfer the digital signal to a neural network module.

The multiplexer is configured to integrate a plurality of image channels into one image channel such that an image acquired by the channel contains image information from the 7 channels.

The CCD detector is configured to image each channel and acquire the target information images from a plurality of channels.

The light filter is configured to transmit a received image to the YoLoV3 neural network-based feature extraction module and the multiplexer sequentially through the polarizer and the CCD detector separately; and the multiplexer is configured to transmit the received image to the Darknet53 neural network-based feature extraction module through the A/D converter.

In the system for polarization detection of a target under strong background light based on multimodal weighted fusion, the YoLoV3 neural network-based feature extraction module includes a convolutional layer, a normalization layer, a Leaky ReLU activation function, an intensity information multi-scale feature extraction module, and a polarization information multi-scale feature extraction module.

The convolutional layer is configured to perform an encoding operation on the target information image.

The normalization layer is configured to perform a decoding operation of the target information image.

The Leaky ReLU activation function is configured to obtain better data fitting.

The intensity information multi-scale feature extraction module is configured to acquire a feature map of an intensity modality.

The polarization information multi-scale feature extraction module is configured to acquire a feature map of a polarization modality.

The convolutional layer is configured to receive an image signal from the CCD detector and transmit the image signal to the intensity information multi-scale feature extraction module and the polarization information multi-scale feature extraction module separately after the image signal passes through the normalization layer and the Leaky ReLU activation function; and the intensity information multi-scale feature extraction module and the polarization information multi-scale feature extraction module are configured to transmit image signals after extraction of features to the residual network-based feature fusion module.

In the system for polarization detection of a target under strong background light based on multimodal weighted fusion, the Darknet53 neural network-based feature extraction module includes luminance layer image conversion, chromaticity layer image conversion, luminance layer image partitioning (into high luminance, medium luminance, and low luminance), (luminance layer partitioned image) logarithmic compression, (chromaticity layer image) guided filtering, luminance layer and chromaticity layer fusion, and luminance and chromaticity fused image feature extraction.

The luminance layer image conversion and the chromaticity layer image conversion are configured to convert a high dynamic range target information image to a space of image luminance data and image chromaticity details through color space conversion.

The luminance layer image partitioning is configured to divide a luminance image into three intervals: low darkness, medium luminance, and high luminance.

The logarithmic compression is configured to realize same correction coefficient for different luminance region images having a poor display effect.

The guided filtering is configured to perform guided filtering on a chromaticity layer image. The filtered chromaticity layer image is similar to the input chromaticity layer image, and the image texture thereof is also more similar to that of a guide image.

The luminance and chromaticity fused image feature extraction is configured to combine the filtered image chromaticity layer and a compressed high luminance layer image to obtain a luminance and chromaticity fused image, and extract 3 multi-scale feature maps in the luminance and chromaticity fused image using the Darknet53 neural network.

The luminance layer image conversion and the chromaticity layer image conversion are configured to separately receive a high dynamic range target information image sent by the A/D converter; the luminance layer image conversion is configured to subject the high dynamic range target information image to the luminance layer image partitioning and then the logarithmic compression; an image signal after the logarithmic compression is subjected to the guided filtering and the luminance layer and chromaticity layer fusion separately, and an image signal after the chromaticity layer image conversion is also subjected to the guided filtering.

A feature is extracted from an image after the luminance layer and chromaticity layer fusion and transmitted to the residual network-based feature fusion module.

In the system for polarization detection of a target under strong background light based on multimodal weighted fusion, the residual network-based feature fusion module includes a Res1 residual network unit, a Res2 residual network unit, a Res8 residual network unit, a Res8 residual network unit, a Res4 residual network unit, a multimodal information integration unit, a Concat cascade unit, a weight analysis unit, a weighted fusion unit, an attention mechanism processing unit, a loss function analysis unit, and a final feature image acquisition unit.

The Res1 residual network unit, the Res2 residual network unit, the Res8 residual network unit, and the Res4 residual network unit are configured to effectively avoid a problem of model degeneration caused by an excessive number of network layers.

The multimodal information integration is configured to perform dimension reduction on the feature map of the intensity modality, the feature map of the polarization modality, and a feature map of a luminance and chromaticity fused modality to complete integration of information of the modalities on different channels.

The Concat cascade is configured to describe the features of different modalities.

The weighted fusion is configured to divide the feature descriptors of the three modalities by a feature descriptor sum as weights of the respective modalities, multiply the weights with the feature maps and then perform cascading fusion to obtain a weighted fused feature map.

The processing using the attention mechanism is configured to select the fused feature map using a channel attention mechanism and a spatial attention mechanism.

The loss function analysis is configured to enhance the visual visualization effect of the image, and meanwhile, improve the visual understanding capability.

The final feature image acquisition is configured to collect a final feature image containing the richest detailed information.

The Res1 residual network unit, the Res2 residual network unit, the Res8 residual network unit, and the Res4 residual network unit are configured to receive images signals after extraction of features by the intensity information multi-scale feature extraction module and the polarization information multi-scale feature extraction module and an image signal after extraction of features following the luminance layer and chromaticity layer fusion, and transmit the image signals to the multimodal information integration, the Concat cascade, and the weight analysis, respectively, and sequentially subject the images of three sets of features to the weighted fusion, the processing using the attention mechanism, the loss function analysis, and the final feature image acquisition, and then transmit the final feature image to the image printing module.

In the system for polarization detection of a target under strong background light based on multimodal weighted fusion, the image printing module is configured for threshold comparison, half-tone image generation, and image printing; and The threshold comparison is configured to compare a gray value of a pixel of the final feature image with a set threshold to distinguish a target pixel and a background pixel.

The half-tone image generation is configured to control image printing.

The image printing module is configured to finally print an image containing only accurate target information.

After the gray value of the pixel of the final feature image is compared with the set threshold, the half-tone image generation is performed on the image and the image containing only accurate target information is printed.

A method for polarization detection of a target under strong background light based on multimodal weighted fusion uses the system for polarization detection of a target under strong background light based on multimodal weighted fusion as described above and specifically includes:

step 1: inlay light filters and polarizers in alignment with CCD detector; place a red light filter 620 nm to 750 nm, a green light filter 495 nm to 570 nm, and a blue light filter 476 nm to 495 nm in front of different CCD detectors to obtain target intensity information images; place four groups of 0°, 45°, 90°, and 135° polarizers to acquire target polarization information images, where each group of one light filter and one polarizer inlaid in alignment with the CCD detector form one channel, and a total of 7 channels are obtained;

step 2: acquire target information images from the 7 channels in step 1, and integrate the target information images from the 7 channels into one image channel and convert an image signal into a high dynamic range target information image;

step 2.1: use the CCD detector to image each channel and acquire the target information images from a plurality of channels;

step 2.2: integrate a plurality of image channels into one image channel using the multiplexer such that an image acquired by the channel contains image information from the 7 channels;

step 2.3: convert the integrated image channel to a digital signal using the A/D converter and transfer the digital signal to the Darknet53 neural network-based feature extraction module;

step 3: transfer the target information images in step 2 to the YoLoV3 neural network-based feature extraction module for encoding and decoding operations;

step 4: subject the decoded information in step 3 into the Leaky ReLU activation function, and acquire a feature map $\{I_1, I_2, I_3\}$ of an intensity modality and a feature map $\{P_1, P_2, P_3\}$ of a polarization modality;

step 5: collect a high dynamic range target information image output by the A/D converter based on a Darknet53 neural network-based feature extraction module, perform the guided filtering on a result of compressing a high luminance layer image after image information conversion, luminance partitioning, logarithmic compression and partitioning, and then perform luminance and chromaticity fusion on the image to finally obtain a feature map $\{V_1, V_2, V_3\}$ of a luminance and chromaticity fused modality;

step 6: perform the multimodal weighted fusion on the feature map $\{I_1, I_2, I_3\}$ of the intensity modality, the feature map $\{P_1, P_2, P_3\}$ of the polarization modality, and the feature map $\{V_1, V_2, V_3\}$ of the luminance and chromaticity fused modality in step 4, followed by dimension reduction, describe features of different modalities after the dimension reduction, and then perform feature map fusion to obtain a weighted fused feature map;

step 7: optimize the weighted fused feature map in step 6 and then perform loss function analysis, and transfer a resulting final feature image containing richest detailed information to the image printing module;

step 7.1: optimize the feature fusion module and select the fused feature map using the channel attention mechanism and the spatial attention mechanism, where the feature map processed by an attention module is denoted as $\{M_{A1}, M_{A2}, M_{A3}\}$.

step 7.2: perform the loss function analysis on the neural network, where the visual visualization effect of the image can be enhanced, and meanwhile, the visual understanding capability is improved; a loss function includes three parts: regression loss, confidence loss, and classification loss;

step 8: compare a gray value of a pixel of the final feature image obtained in step 7 with a threshold δ, and separate a background and a target;

where when the gray value of the pixel is greater than the threshold δ, the pixel is classified as a background pixel; when the gray value of the pixel is less than the threshold δ, the pixel is classified as a target pixel, and separation of the background and the target is realized; and the threshold δ is acquired by a neural network based on image information in real time; and step 9: generate a half-tone image from the separated target information in step 8 and print the half-tone image.

The half-tone image generation is configured to control image printing. Printing is continued when the pixel is identified as the target pixel. Printing is automatically stopped when the pixel is identified as the background pixel.

In the method for polarization detection of a target under strong background light based on multimodal weighted fusion, step 3 specifically includes:

step 3.1: collect target information images of the CCD detectors from a plurality of channels based on the YoLoV3 neural network-based feature extraction module, and transfer the target information images to the convolutional layer to perform the encoding operation on the information; and step 3.2: after the convolutional layer encodes the information, transfer the encoded information to the normalization layer for the decoding operation; and step 4 specifically includes:

step 4.1: subject the decoded information into the Leaky ReLU activation function for running to allow for better performance of the neural network and obtain better data fitting; and step 4.2: acquire 3 multi-scale feature maps from the information after running in step 4.1 on intensity and polarization branches of the YoLoV3 neural network, respectively, where the feature map of the intensity modality is denoted as $\{I_1, I_2, I_3\}$, and the feature map of the polarization modality is denoted as $\{P_1, P_2, P_3\}$.

In the method for polarization detection of a target under strong background light based on multimodal weighted fusion, step 5 specifically includes:

step 5.1: collect the high dynamic range target information image output by the A/D converter based on the Darknet53 neural network-based feature extraction module; and convert an input high dynamic range image to L*a*b* space through color space conversion, where L* records image luminance data, and a* and b* record image chromaticity details; accordingly, luminance layer and chromaticity layer images are obtained;

step 5.2: obtain specific image luminance data according to L*, ascertain a maximum luminance value (a white point)\a minimum luminance value (a black point) of the image, and divide a luminance image into three intervals: low darkness ($L_D$–$L_{min}$), moderate ($L_B$–$L_D$), and high luminance ($L_{mac}$–$L_B$);

step 5.3: perform logarithmic compression and partitioning on a luminance layer image, where due to a large dynamic interval of the high dynamic range image, a same correction coefficient may be realized for different luminance region images having a poor display effect; divide a high luminance layer image, and select different adjustment parameters γ in different regions after logarithmic mapping to correct the luminance layer image;

step 5.4: use a result of compressing the high luminance layer image as a guide image to perform guided filtering on the chromaticity layer image, where the filtered image is entirely similar to the input chromaticity layer image, and the image texture thereof is also more similar to that of the guide image; and step 5.5: combine the filtered image chromaticity layer and the compressed high luminance layer image to obtain a luminance and chromaticity fused image, and extract 3 multi-scale feature maps in the luminance and chromaticity fused image using the Darknet53 neural network, where the feature map of the luminance and chromaticity fused modality is denoted as $\{V_1, V_2, V_3\}$.

In the method for polarization detection of a target under strong background light based on multimodal weighted fusion, step 6 specifically includes:

step 6.1: perform multimodal weighted fusion on extracted features of the intensity modality, features of the polarization modality, and features of the luminance and chromaticity fused modality using a residual network, where the structure of the residual network has 5 residual network units, and a problem of model degeneration caused by an excessive number of network layers can be effectively avoided;

step 6.2: perform dimension reduction on the feature maps $\{I_1, I_2, I_3\}$, $\{P_1, P_2, P_3\}$, and $\{V_1, V_2, V_3\}$ of different modalities using a neural network to complete integration of information of the modalities on different channels;

step 6.3: describe the features of different modalities using Concat cascade, where a feature descriptor of the luminance and chromaticity fused modality is $A_v$, a feature descriptor of the polarization modality is $A_p$, and a feature descriptor of the intensity modality is $A_I$, which are added as $A_m$;

step 6.4: divide the feature descriptors of the three modalities by the feature descriptor sum $A_m$ as weights of the respective modalities, multiply the weights with the feature maps and then perform cascading fusion to obtain the weighted fused feature map; and step 6.5: perform weighted fusion on three sets of features obtained in steps 6.2 to 6.4 to obtain a multimodal weighted fused feature map denoted as $\{M_1, M_2, M_3\}$.

What is claimed is:

1. A method for polarization detection of a target under strong background light based on multimodal weighted fusion, comprising:

step 1: inlaying light filters and polarizers in alignment with CCD detectors, wherein each group of one light filter and one polarizer inlaid in alignment with one CCD detector form one channel, and a total of 7 channels are obtained;

step 2: acquiring target information images from the 7 channels in step 1, and integrating the target information images from the 7 channels into one image channel and converting an image signal into a high dynamic range target information image;

step 3: performing encoding and decoding operations on the target information images based on a YoLoV3 neural network;

step 4: subjecting the decoded information in step 3 into a Leaky ReLU activation function, and acquiring a feature map $\{I_1,I_2,I_3\}$ of an intensity modality and a feature map $\{P_1,P_2,P_3\}$ of a polarization modality;

step 5: collecting a high dynamic range target information image output by an analog to digital (A/D) converter based on a Darknet53 neural network, performing guided filtering on a result of compressing a high luminance layer image after image information conversion, luminance partitioning, logarithmic compression and partitioning, and then performing luminance and chromaticity fusion on the image to finally obtain a feature map $\{V_1,V_2,V_3\}$ of a luminance and chromaticity fused modality;

step 6: performing the multimodal weighted fusion on the feature map $\{I_1,I_2,I_3\}$ of the intensity modality, the feature map $\{P_1,P_2,P_3\}$ of the polarization modality, and the feature map $\{V_1,V_2,V_3\}$ of the luminance and chromaticity fused modality in step 4, followed by dimension reduction, describing features of different modalities after the dimension reduction, and then performing feature map fusion to obtain a weighted fused feature map;

step 7: optimizing, by attention mechanism processing, the weighted fused feature map in step 6 and then performing loss function analysis to obtain a final feature image containing richest detailed information;

step 8: comparing a gray value of a pixel of the final feature image obtained in step 7 with a threshold δ, and separating a background and the target;

wherein when the gray value of the pixel is greater than the threshold δ, the pixel is classified as a background pixel; when the gray value of the pixel is less than the threshold δ, the pixel is classified as a target pixel, and separation of the background and the target is realized; and the threshold δ is acquired by a neural network based on image information in real time; and step 9: generating a half-tone image from the separated target information in step 8 and printing the half-tone image.

2. The method for polarization detection of a target under strong background light according to claim 1, wherein step 3 further comprises:

step 3.1: collecting target information images of the CCD detectors from a plurality of channels based on the YoLoV3 neural network, and transferring the target information images to a convolutional layer to perform the encoding operation on the information; and step 3.2: after the convolutional layer encodes the information, transferring the encoded information to a normalization layer for the decoding operation; and step 4 further comprises:

step 4.1: subjecting the decoded information into the Leaky ReLU activation function for running to allow for better performance of the neural network and obtain better data fitting; and step 4.2: acquiring 3 multi-scale feature maps from the information after running in step 4.1 on intensity and polarization branches of the YoLoV3 neural network, respectively, wherein the feature map of the intensity modality is denoted as $\{I_1,I_2,I_3\}$, and the feature map of the polarization modality is denoted as $\{P_1,P_2,P_3\}$.

3. The method for polarization detection of a target under strong background light according to claim 1, wherein step 5 further comprises:

step 5.1: collecting the high dynamic range target information image output by the A/D converter based on the Darknet53 neural network; and converting an input high dynamic range image to L*a*b* space through color space conversion, wherein L* records image luminance data, and a* and b* record image chromaticity details; accordingly, luminance layer and chromaticity layer images are obtained;

step 5.2: obtaining specific image luminance data according to L*, ascertaining a maximum luminance value and a minimum luminance value of the image, and dividing a luminance image into three intervals: low darkness, moderate, and high luminance;

step 5.3: performing logarithmic compression and partitioning on a luminance layer image, wherein due to a large dynamic interval of the high dynamic range image, a same correction coefficient is realized for different luminance region images having a poor display effect; dividing a high luminance layer image, and selecting different adjustment parameters γ in different regions after logarithmic mapping to correct the luminance layer image;

step 5.4: using a result of compressing the high luminance layer image as a guide image to perform guided filtering on the chromaticity layer image; and step 5.5: combining the filtered image chromaticity layer and the compressed high luminance layer image to obtain a luminance and chromaticity fused image, and extracting 3 multi-scale feature maps in the luminance and chromaticity fused image using the Darknet53 neural network, wherein the feature map of the luminance and chromaticity fused modality is denoted as $\{V_1,V_2,V_3\}$.

4. The method for polarization detection of a target under strong background light according to claim 1, wherein step 6 further comprises:

step 6.1: performing multimodal weighted fusion on extracted features of the intensity modality, features of the polarization modality, and features of the luminance and chromaticity fused modality using a residual network;

step 6.2: performing dimension reduction on the feature maps $\{I_1,I_2,I_3\}$, $\{P_1,P_2,P_3\}$, and $\{V_1,V_2,V_3\}$ of different modalities using a neural network to complete integration of information of the modalities on different channels;

step 6.3: describing the features of different modalities using Concat cascade, wherein a feature descriptor of the luminance and chromaticity fused modality is $A_v$, a feature descriptor of the polarization modality is $A_p$, and a feature descriptor of the intensity modality is $A_I$, which are added as $A_m$;

step 6.4: dividing the feature descriptors of the three modalities by the feature descriptor sum $A_m$ as weights of the respective modalities, multiplying the weights with the feature maps and then performing cascading fusion to obtain the weighted fused feature map; and step 6.5: performing weighted fusion on three sets of features obtained in steps 6.2 to 6.4 to obtain a multi-modal weighted fused feature map denoted as $\{M_1, M_2, M_3\}$.

\* \* \* \* \*